June 2, 1931.  H. W. PLEISTER  1,808,318
BOLT ANCHOR AND METHOD
Filed Oct. 31, 1929  4 Sheets-Sheet 1
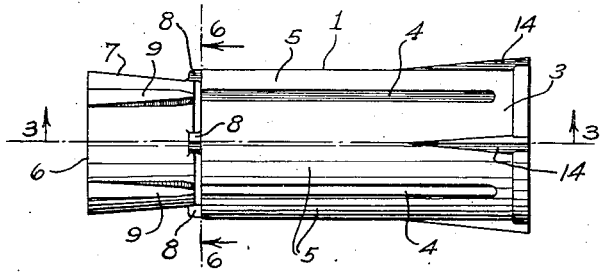
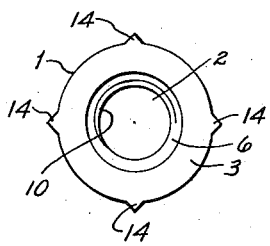
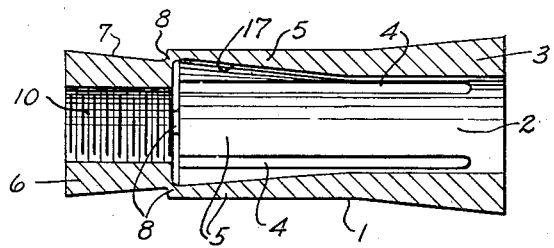
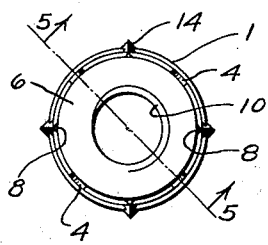
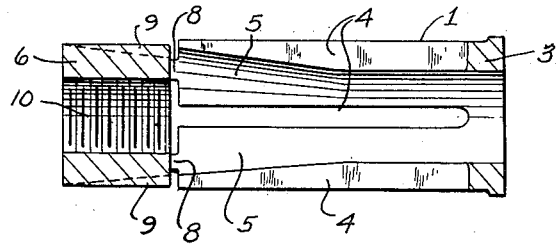
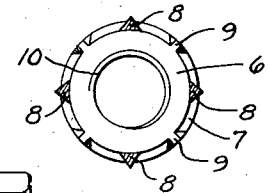
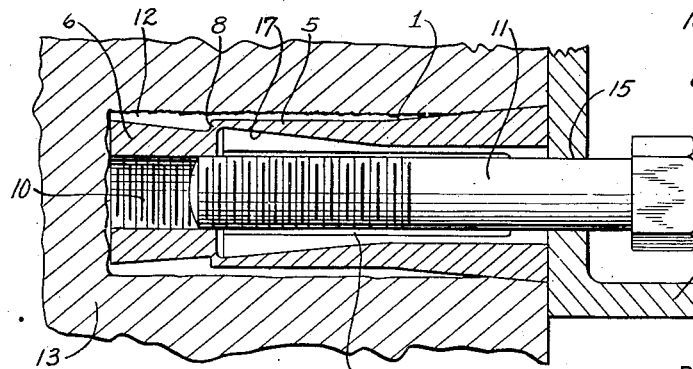
Henry W. Pleister
INVENTOR
BY
ATTORNEY June 2, 1931.  H. W. PLEISTER  1,808,318
BOLT ANCHOR AND METHOD
Filed Oct. 31, 1929  4 Sheets-Sheet 2
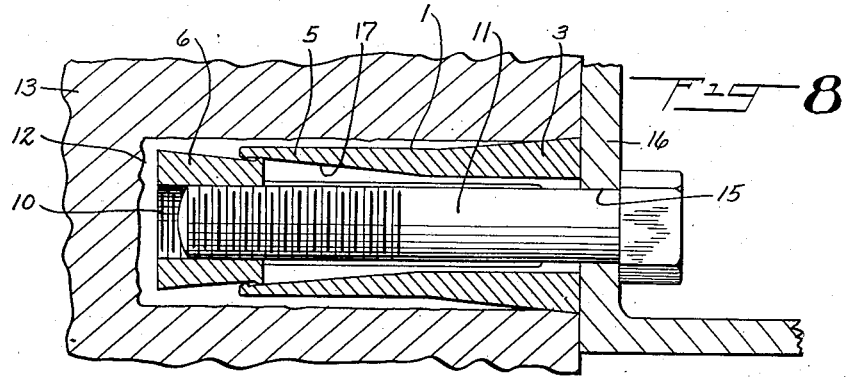
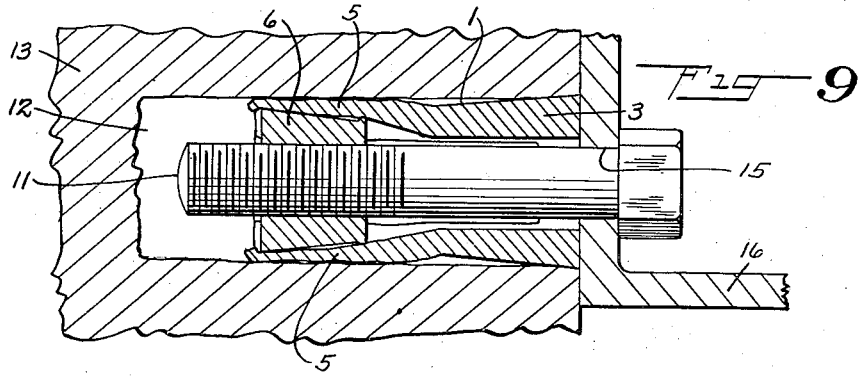
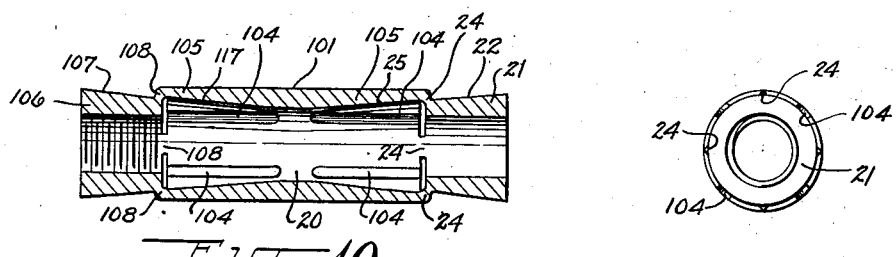
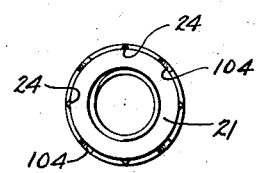
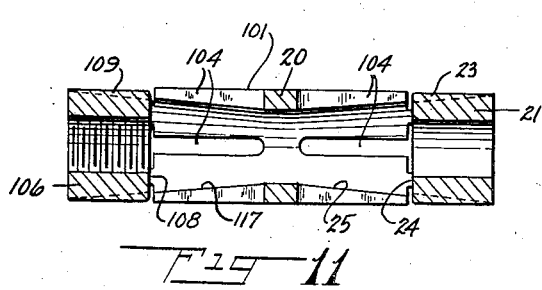
Henry W. Pleister
INVENTOR
BY
ATTORNEY

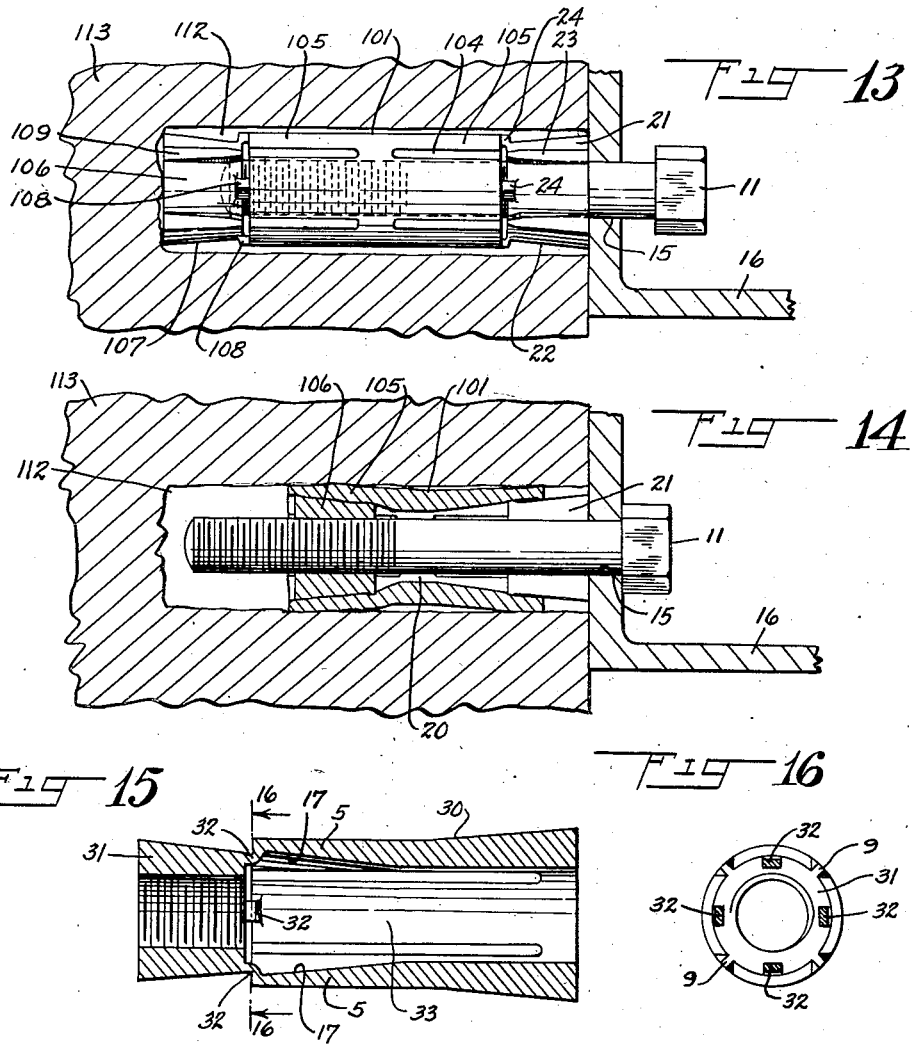

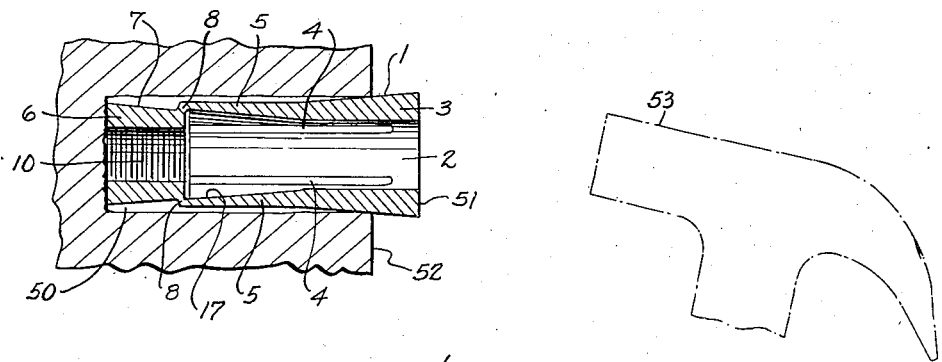
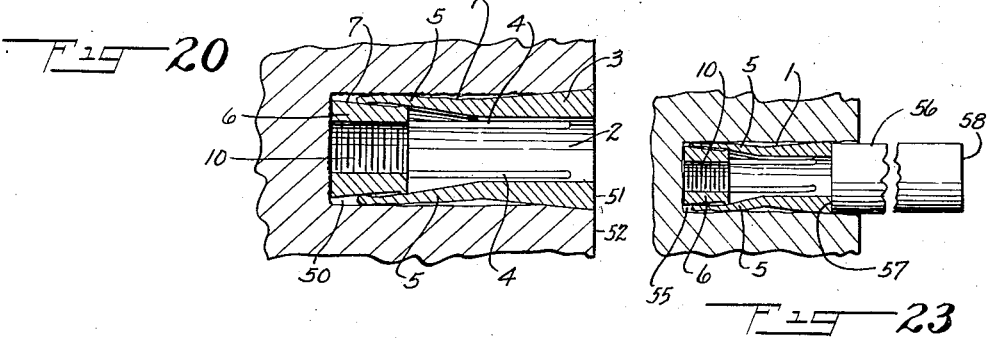
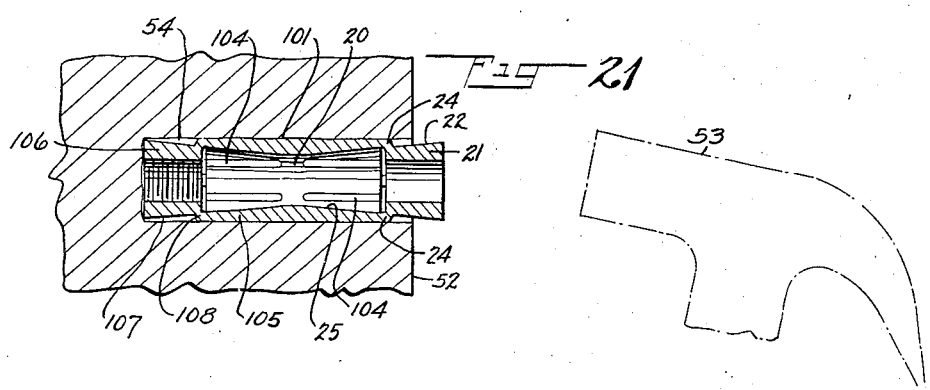
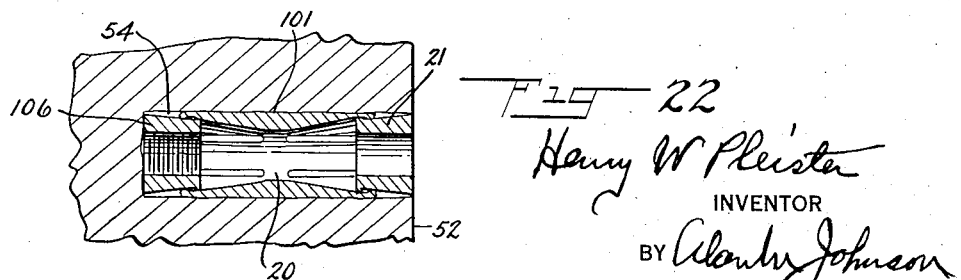

Patented June 2, 1931

1,808,318

UNITED STATES PATENT OFFICE

HENRY W. PLEISTER, OF WESTFIELD, NEW JERSEY, ASSIGNOR TO HENRY B. NEWHALL CORPORATION, OF GARWOOD, NEW JERSEY, A CORPORATION OF NEW JERSEY

BOLT ANCHOR AND METHOD

Application filed October 31, 1929. Serial No. 403,874.

My invention relates to bolt anchors and the method of manufacturing them.

My invention further relates to a bolt anchor including expanding means formed originally in one integral piece, with integral connecting members holding them together, said integral connected member being broken in situ.

My invention further relates to an integral bolt anchor formed of an integral shield or cage and expanding means connected to said shield or cage by breakable means, said breakable means being of sufficient strength to withstand handling and transportation.

My invention further relates to a machine type expansion in which the shield or cage and expanding means are all formed integral; the expanding means being broken from the shield or cage in situ, and then adapted to telescope and expand the shield or cage by the aid of the usual machine bolt.

My invention further relates to certain combinations, sub-combinations, methods, articles of manufacture and details of construction, all of which will be more fully hereinafter-described and pointed out in the claims.

In the figures I have shown different embodiments of my invention, the same reference numerals refer to similar parts of the several figures.

Fig. 1 is a plan view of one form of both anchor, made in accordance with my invention;

Fig. 2 is an end view looking to the left of Fig. 1;

Fig. 3 is a vertical section on line 3—3 of Fig. 1, looking in the direction of the arrows;

Fig. 4 is an end elevation looking to the right of Fig. 3;

Fig. 5 is a section on line 5—5 of Fig. 4;

Fig. 6 is a vertical section on line 6—6 of Fig. 1;

Fig. 7 is a vertical section of the machine type bolt anchor of Fig. 1, mounted in a hole and about to be expanded by a machine bolt;

Fig. 8 is a vertical section, similar to Fig. 7, illustrating the action of the machine bolt breaking the connecting members;

Fig. 9 is a vertical section, similar to Fig. 8, illustrating the telescoping action and the full expansion of the expansion bolt;

Fig. 10 is a vertical section of a modification illustrating a double type machine expansion;

Fig. 11 is a vertical section on line 11—11 of Fig. 10;

Fig. 12 is an end view of Fig. 10;

Fig. 13 is a vertical section of the double type machine expansion of Fig. 10, about to be expanded by a machine bolt;

Fig. 14 is a vertical section similar to Fig. 13, showing the telescoping action and the bolt anchor expanded;

Fig. 15 is a vertical section of a modified form;

Fig. 16 is a section on line 16—16 of Fig. 15, looking in the direction of the arrows;

Fig. 17 is a plan view of another modification in which the breakable connections are first formed extended;

Fig. 18 is a fragmentary section, showing how the extended breakable connections of Fig. 17 are placed in extreme shear position by forcing the cone and shield toward each other.

Fig. 19 is a vertical section of my bolt anchor mounted in a hole about to be expanded by a hammer.

Fig. 20 is a vertical section showing the bolt anchor expanded.

Fig. 21 is a vertical section of a double type machine expansion about to be expanded by a hammer.

Fig. 22 is a vertical section, similar to Fig. 21, showing the double type machine expansion after being expanded by blows upon the cone sleeve.

Fig. 23 is a vertical section showing the manner of expanding my bolt anchor in a comparatively deep hole, by the aid of a tool.

My invention relates to simplifying and cheapening the cost of manufacturing bolt anchors. For purposes of illustration I have shown in my drawings a single and double type machine bolt expansion, though, of course, my invention is not to be limited to these particular forms of expansion bolts.

In the ordinary machine type expansion the shell or cage is formed of two or more parts held together usually by means of a split spring ring. In the single type machine expansion, a tapped cone nut has to be assembled and held within the shell or case by the same split spring ring. In the double machine type there is, in addition, an unthreaded cone sleeve held in the other end of the shell or cage by a second split spring ring. In transportation and in rough handling these assembled parts are apt to become disconnected, and, in some instances one or more of the parts might become lost, leading to the discard of the entire bolt anchor.

Among other advantages of my invention I avoid all the cost of assembling different parts, the cost of the split spring rings, or other securing means, any loss of parts in transportation or handling, and cheapen the cost of manufacture.

By my invention I cast, or otherwise form, a complete bolt anchor with the shield or cage and expanding member, or members, as one article, connected together with breakable connections adapted to be broken in situ.

In Figures 1 and 9 I have illustrated a single type machine expansion; and in Figures 15 to 18, a modified form of breakable connections.

For purposes of illustration and description, I will describe my bolt anchor as cast, though, of course, they may be otherwise formed.

In the single type machine expansion 1 is the integral shield formed with an axial bore 2, a head 3, a plurality of slots 4, 4, four such slots being preferably employed forming four tines 5, 5. Cast integral with the shield 1 is the expanding member or cone 6 formed with the conical surface 7. This cone, or expanding member, 6, is connected with the tines 5, 5 by breakable necks or runners. I also preferably, though not necessarily, form on the conical surface 7 of the cone 6, fins 9, 9 one each being preferably located opposite the ends of the open slots 4, 4. These fins entering the slots 4, 4, in a manner to be hereinafter described, present any relative rotation between the cone 6 and the shield 1. Preferably I form the fins 9, 9 as wedges so that, in addition to preventing any rotation of the cone in the shield or cage, they will assist in separating and hence expandng the different tines 5, 5.

When my bolt anchor is cast the breakable necks 8, 8 are runners permitting the ready flow of the metal to form the integral cone from the single, or double gate, whichever may be found most expedient.

After casting, or otherwise forming the bolt anchor of Fig. 1, the hollow cone nut 6 is tapped to form the female threads 10, to cooperate with the male threads upon the machine bolt 11, Fig. 7.

After the integral bolt anchor is cast and the cone nut tapped it may be handled and shipped as a single article of manufacture, the cone nut 6 being held to the shield 1 by means of the breakable runners or necks 8, 8.

In use the integral bolt anchor is placed in a hole 12 of the required size in the support of masonry, brick, concrete, stone, terra cotta, or similar material, the ribs 14, 14 being preferably employed to bite into the surface of the hole to prevent rotation of the shield 1. The bolt 11 is then passed through the hole 15 in the work 16 until its threads cooperate with the threads 10 in the integral cone nut 6, Fig. 7. The continued rotation of the bolt will act upon the cone to draw it into the tapered interior of the shield, which inward action of the nut will serve first to bend and then to break the connections, or runners 8, 8 connecting the cone 6 to the shield 1. Still further rotation of the bolt 11 will draw the cone nut 6 within the shield 1, the shield being provided with a flaring surface 17 to cooperate with the conical nut 6. The fins or wedges 9, 9 entering the slots 4, 4 serve to assist in expanding the shield 1 and also prevent any relative rotation between the nut and shield.

I have illustrated in Figs. 10–14 inclusive, a double machine type expansion made in accordance with my invention.

In this form the shield 101 is formed with two interior inclined or flaring surfaces 117, and 25 and two sets of longitudinally extending slots 104, 104 extending inward from opposite ends of the shield, separated by the stop 20 which is a continuous ring of metal from which the two sets of tines 105, 105 extend in opposite directions. The integral conical nut 106 is provided with a conical surface 107, fins or wedges 109, and breakable runners or connecting members 108, the same as in the corresponding single machine type previously described.

In this double type machine expansion there is also cast, or otherwise formed, integral with the shield 101, a collar 21 with a conical bearing surface 22, fins or wedges 23 and runners or breakable members 24, 24. The end of the shield 101 adjacent to the collar 21 is provided with the inclined or flaring surface 25 in all respects similar to the inclined or flaring surface 117. The nut 106 is tapped as in the single type, but the collar 21 is unthreaded.

In use, the integral unbroken bolt anchor is placed in the hole 112 in the support 113 and the machine bolt 11 is passed through a hole 15, in the work 16 until its threads engage with those of the integral conical nut 106, Fig. 13. Further rotation of the machine bolt 11 will cause the runners or breakable connections 108, 108 to bend and break so that the nut 106 can be drawn into the shield 101 to expand it. At the same time the runners or breakable members 24, 24 connecting the collar 21 with the shield 101 will first bend and then break to permit the collar 21 to move into the opposite end of the shield 101 and expand it as shown in Fig. 14, its fins or wedges 109 moving down the cooperating slots 104, 104 on the end of the shield. The part 20 is arranged to contact with the fins or wedges 109, 109 on the cone nut 106 and also on the loose collar 21 to prevent excessive inward movement of the nut and collar. The opening in the mold forming the stop 20 also serves to assist the quick flow of the molten metal, when the bolt anchor is cast as is the preferred method of manufacture.

In Figs. 15 and 16 I have illustrated a modification.

In this form the shield 30 and conical nut 31 are essentially the same as that illustrated in Figs. 1 and 2, the difference being in the manner of casting or otherwise forming the runners or breakable members 32, 32. As illustrated in Fig. 15 these runners or breakable members instead of extending straight out from the tines 5, 5, first extend an appreciable distance towards the axial bore 33 of the shield, and then outward where they connect with the integral nut 31. This brings the forward portion of the conical nut 31 more in line with the flaring surfaces 17. It also insures that the first inward movement of the nut places these runners, or breakable members, under a shearing strain which will permit them to be broken more easily by rotating the machine bolt 11.

In Figs. 17 and 18 I have shown another modification.

In this form the shield 35 and conical nut 36 are essentially the same as in the form shown in Fig. 1, with the exception of the runners or breakable members 37, 37 which are cast, or otherwise formed, extended so that the conical nut 36 is held at a greater distance from the shield 35 than in the finished article. Then, by means of pressure exerted in a press or otherwise, the cone nut 36 is made to approach the shield slightly, enough to bend the breakable runners or necks 37, 37, Fig. 18, but not to break them, thereby placing them in extreme shear position and thus weaken them so that when tension is applied by the bolt 11 they will more readily break, permitting the cone nut to be more readily drawn into the shield.

It is of course to be understood that the modified form of breakable runners or necks shown in the modification Figs. 14 to 18 inclusive, may be employed with the double type expansion of Fig. 10 to 14 and may be used to connect not only the cone but also the loose collar with its shield.

I have illustrated in Figs. 19 to 22 inclusive another method of expanding my bolt anchor.

To save the expense of drilling a hole of full depth, such as is shown in Figs. 8 and 9, I may drill a hole 50, Fig. 19, slightly less in depth than the length of shield 1 with its rigid cone 6, so that when the bolt anchor is located in a hole a portion 51 will extend out from the face of the wall 52.

When this protruding portion 51 is subjected to force, as to blows of a hammer 53, or other tool, it will be driven into the hole 50, the runners or breakable connections 8, 8 being broken and the tines 5, 5 of the shield being forced over the cone nut 6, which is seated at the bottom of the hole, until the portion 51 is flush with the surface 52 of the wall. In this position the bolt anchor will be pre-set and pre-expanded, as shown in Fig. 20, without the aid of a bolt 11. Such a bolt may be later used to support the work, not shown; and, if necessary, the bond or grip of the bolt anchor may be increased by rotating the bolt 11, not shown in Fig. 20, drawing the nut 6 still further into the shield.

In Figs. 21 and 22 I have illustrated the method of expanding a double type machine expansion bolt in the same manner. In these figures the machine bolt expansion is the same as that illustrated in Fig. 10 and fully described in the specification. The hole 54 being of less depth than the integral bolt anchor, a portion of the integral cone 21 will extend out from the surface 52 of the wall. Blows of the hammer 53 on the exposed portion of the cone 21 will cause the breakable runners or connecting members 108, 108, and 24, 24 to break and permit the threaded cone nut 107 and the unthreaded cone sleeve 22 to be forced into the shield 101 and expand it as shown in Fig. 22.

After the expansion the bolt 11 may be employed to support the work, not shown. If, as a mater of precaution, it is thought desirable to increase the bond or grip of the bolt anchor, this may be readily done by screwing up on the bolt 11, which will increase the telescoping action and the expansion of the shield.

My bolt anchor is also adapted to be expanded by any suitable tool in a comparatively deep hole, as for example 55 in Fig. 23.

In this method of using my expansion the bolt anchor is seated in the deep hole 55 until the rigid integral cone nut 6 engages with the bottom of the hole. As the hole is too deep to permit the hammer 53 to engage with the shield a removable tool 56 is employed, one end 57 being brought to bear on the shield while the other end 58 is hammered by the hammer 53. After the runners or breakable connections are broken and the cone nut 6 forced into the shield expanding it, the tool 56 is withdrawn. The bolt 11 may then be used to support the work, not shown, or may be employed to increase the expansion by rotating the bolt causing the screw threaded cone nut 6 to move further into the shield.

Using the methods illustrated in Figs. 19

19–23 it will be possible to pre-set and pre-expand all the bolt anchors required on the job before the bolts 11 are passed into them and the work fastened up.

Of course the double type machine expansion bolt illustrated in Figs. 13, 14, 21, 22 may be expanded in a hole in the same manner.

While I have illustrated and described a machine bolt cooperating with the cone nut, it is of course to be understood that my invention and my claims cover a bolt having lag screw threads, or any other form of threads, and that the cone nut will be provided with cooperating female thread.

Having thus described this invention in connection with illustrative embodiments thereof, to the details of which I do not desire to be limited, what is claimed as new and what is desired to secure by Letters Patent is set forth in the appended claims.

What I claim is:

1. A new article of manufacture comprising a bolt anchor having an integral shield and integral expanding means connected together by integral breakable means to permit the expanding means to be forced into the shield to expand it.

2. A new article of manufacture comprising an integral rigid bolt anchor formed of a plurality of integral expanding and expansible movable parts rigidly held together by integral breakable means which when broken permit the expanding and expansible movable parts to cooperate with each other.

3. A new article of manufacture comprising an integral rigid cast bolt anchor formed of a plurality of expanding and expansible movable parts rigidly held together by breakable means.

4. A new article of manufacture comprising an integral rigid cast bolt anchor formed of a plurality of expanding and expansible moving parts rigidly held together by breakable runners.

5. A new article of manufacture comprising an integral bolt anchor formed of a cast metal shield and cast metal expanding means rigidly held to the shield by breakable runners employed to permit the ready flow of the fluid metal in casting the bolt anchor.

6. A new article of manufacture comprising an integral bolt anchor formed of a cast metal shield and cast metal expanding means rigidly held in axial alinement with the shield by breakable runners employed to permit the ready flow of the fluid metal in casting the bolt anchor.

7. A new article of manufacture comprising an integral bolt anchor formed of an expansible cast metal shield and a cast metal cone nut rigidly held to the shield by breakable means.

8. A new article of manufacture comprising an integral bolt anchor formed of an expansible cast metal shield and a cast metal cone nut rigidly held to the shield by breakable runners.

9. In a bolt anchor the combination of an expansible shield provided with slots and an integral expanding member rigidly held to the shield by breakable means adapted to be broken in situ.

10. In a bolt anchor the combination of an expansible shield provided with slots and an integral expanding member rigidly held to the shield by breakable means adapted to be broken in situ, said expanding member being provided with means to engage the slots in the shield.

11. The method of manufacturing a machine bolt type expansion consisting in casting the shield and cone nut at one and the same time, the cone nut being separated from but rigidly held to the shield by breakable runners employed in the casting operation, and then tapping the cone nut.

12. The method of manufacturing a machine bolt type expansion consisting in casting the shield, cone nut and cone collar at one and the same time, the cone nut and cone collar being separated but rigidly held to the shield by breakable runners employed in the casting operation, and then tapping the cone nut.

HENRY W. PLEISTER.